US005935676A

United States Patent [19]

Merriman et al.

[11] Patent Number: 5,935,676

[45] Date of Patent: Aug. 10, 1999

[54] SLIP RESISTANT ROOF MAT

[76] Inventors: Monte E. Merriman; Carolyn C. Merriman, both of 5616 S. Gas Plant Rd., San Angelo, Tex. 76904

[21] Appl. No.: 08/956,167

[22] Filed: Oct. 24, 1997

[51] Int. Cl.[6] ................................ B32B 3/14; E04F 11/16

[52] U.S. Cl. .............................. 428/77; 428/99; 428/100; 428/167; 52/177

[58] Field of Search .................................. 428/33, 57, 61, 428/99, 192, 77, 100, 167, 409; 5/417; 52/177, 518, 543

[56] References Cited

U.S. PATENT DOCUMENTS

| | | | |
|---|---|---|---|
| 4,137,356 | 1/1979 | Shoemaker | 428/24 |
| 4,568,587 | 2/1986 | Balzer | 428/52 |
| 4,644,592 | 2/1987 | Small | 428/79 |
| 4,654,245 | 3/1987 | Balzer et al. | 428/52 |
| 4,674,245 | 6/1987 | Turner | 52/177 |
| 5,157,804 | 10/1992 | Williams | 15/161 |

*Primary Examiner*—Donald Loney
*Attorney, Agent, or Firm*—Joseph H. McGlynn

[57] ABSTRACT

A mat that can be attached to a slanted surface to increase the traction for persons who have to walk on the surface while constructing or repairing the surface.

10 Claims, 1 Drawing Sheet

SLIP RESISTANT ROOF MAT

BACKGROUND OF THE INVENTION

This invention relates, in general, to a safety mat, and, in particular, to a safety mat that can be used to increase footing on a roof.

DESCRIPTION OF THE PRIOR ART

In the prior art various types of mats have been proposed. For example, U.S. Pat. No. 5,157,804 discloses a roll-up entrance mat which comprises a plurality of elongated rail members with tread supporting rail members and a pair of rigid, bulbous coupling portions that can secure the rail members together.

U.S. Pat. No. 4,674,245 discloses a roof walkway panel which includes an upper concrete wear section and a bottom bonded synthetic foam pad for resiliency and protection of the surface that the mat is used on. U.S. Pat. No. 4,654,245 discloses a roll up floor mat with rails interconnected with alternating, flexible strips which cushion the mat.

U.S. Pat. No. 4,568,587 discloses a floor mat with rail sections that are hinged together to allow the mat to be rolled up.

While the prior art devices work for their intended purpose, none of the prior art devices address and solve the problem of increasing traction on a slanted, slippery surface.

SUMMARY OF THE INVENTION

The present invention comprises a mat that can be attached to a slanted surface to increase the traction for persons who have to walk on the surface while constructing or repairing the surface.

It is an object of the present invention to provide a traction mat that can be easily and quickly attached to a slanted surface.

It is an object of the present invention to provide a traction mat that is easy to transport and store.

These and other objects and advantages of the present invention will be fully apparent from the following description, when taken in connection with the annexed drawings.

DESCRIPTION OF THE PREFERRED EMBODIMENT

Figure 1:
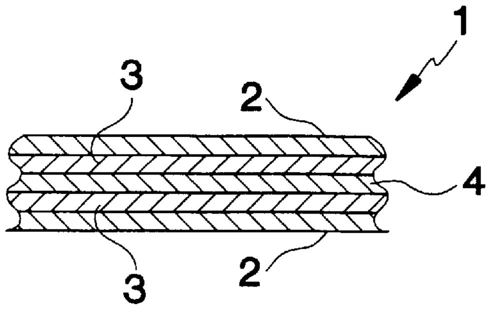
FIG. 1 is cross-sectional view of the present invention.

Referring now to the drawings in greater detail, FIG. 1 shows the traction mat 1 of the present invention. The mat 1 comprises a inner layer 4 of a strong, flexible material such as, but not limited to fiberglass matting material. Sandwiched on both sides of the inner layer 4 is an outer layer 3 of a material that is both strong and has an anti-slip surface on at least one side. One of the materials that can be used for the layers 3 is a foam shelf liner material, however, other materials that are resistant to tearing and have anti-slip characteristics can also be used. These three layers, i.e. layer 4 and the two layers 3 on opposite sides of the layer 4, can be attached together by a high strength, double duty upholstery thread as shown by the dotted lines 13 in FIG. 2.

Figure 2:
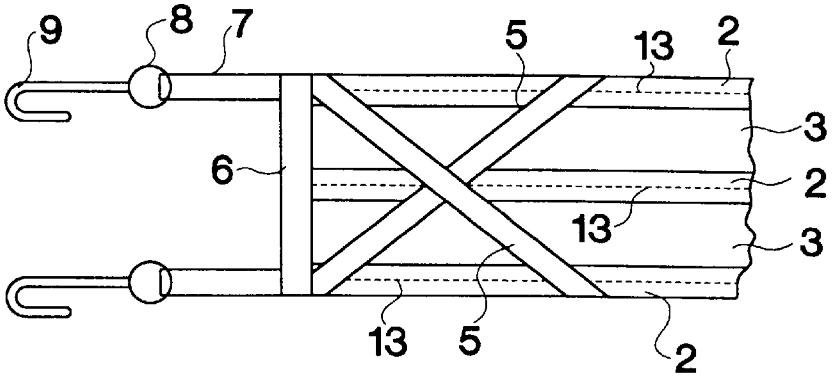
FIG. 2 is a plan view of the present invention.

As can be more clearly seen in FIG. 2, the thread is applied to both sides and down the middle of the mat 1 in order to reinforce the mat. Although the preferred manner of reinforcing the mat is the above mentioned thread, it should be understood that other methods of reinforcement can be used without departing from the scope of the invention.

Also shown in FIG. 2 is the tape strips 2 which are applied along opposite sides of the mat and down the middle. The preferred tape is a sturdy 100% cotton cloth binding tape for strength and durability, however, other reinforcing materials can be used. It should be noted that the tape 2 is shown in FIG. 2 as being applied over the stitching 13, however, the tape could be applied first and the stitching 13 could be applied over the tape 2.

In addition, an X-shaped reinforcing of tape 5 is applied adjacent one end of the mat, and a horizontal layer 6 of the same tape is applied from side-to-side of the mat for additional reinforcing. Attached to the same end as the X-shaped reinforcements is at least a pair of hooks 9 which can be attached to the mat 1 by means of rings 8 and straps 7. The rings 8 and straps 7 can be attached to the hooks and the mat in any conventional manner.

The hooks 9 are steel "J" hooks which are preferably coated with plastic to protect the surfaces the hooks are applied to and to prevent slipping of the hooks.

Figure 3:
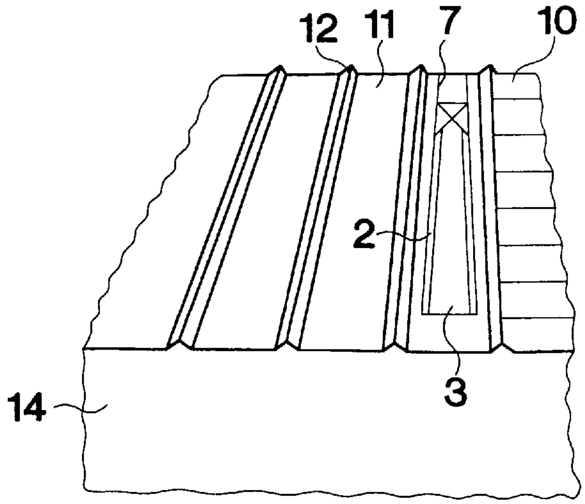
FIG. 3 is a perspective view of the present invention used on a slanted surface.

The mat is used as illustrated in FIG. 3 to increase the traction of workers on a slanted roof surface on a building 14. The type of surface being applied to the roof is a metal sheeting that has peaks 12 and valleys 11, however, the mat can be used to increase traction on other slanted surfaces as well. As shown in FIG. 3 the mat has been laid in the valley 11 of one of the metal sheets adjacent to unfinished roof section 10. This will allow the workers to walk along the valley 11 while they are applying the metal sheeting to the unfinished roof section 10.

The mat 1 can be attached to the valley 11 by placing the hooks 9 over the ridge of the roof and allowing the mat to extend along the length of the valley. The additional reinforcing (the X-shaped tape sections 5 and the horizontal tape 6 will prevent the mat from tearing loose from the hooks 9 as strain is placed thereon by the workers walking on the mat. In addition, the surfaces 3 will provide a non-slip surface along the valley as a safety factor so the workers will not slip and possibly fall off the roof.

Although the Slip Resistant Roof Mat and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What we claim as our invention is:

1. A slip resistant mat adapted to be attached to a slanted surface, comprising:

a first layer having a length, a width and a pair of opposing surfaces extending between said length and width, a second and third layer having a length, a width and a pair of opposing surfaces extending between said length and width, said second and third layers being attached to said first layer so that said second layer engages one of said opposing surfaces of said first layer, and said third layer engages another of said opposing surfaces of said first layer, said second and third layers having a slip resistant surface, means for reinforcing said layers, said means for reinforcing said layers extending along the lengths of said layers and extending along a central portion of said layers, and means for securing said layers to a slanted surface.

2. The slip resistant mat as claimed in claim 1, wherein said mat has a second means for reinforcing said layers, said second means for reinforcing said layers being attached to said layers at one end thereof, and extends across the width of said layers.

3. The slip resistant mat as claimed in claim 2, wherein said mat has a third means for reinforcing said layers, said third means for reinforcing said layers being attached to said layers at one end thereof, and extends at an angle from a first side of said layers to a second side of said layers.

4. The slip resistant mat as claimed in claim 1, wherein said means for reinforcing said layers is cloth binding tape.

5. The slip resistant mat as claimed in claim 2, wherein said second means for reinforcing said layers is cloth binding tape.

6. The slip resistant mat as claimed in claim 2, wherein said third means for reinforcing said layers is cloth binding tape.

7. The slip resistant mat as claimed in claim 1, wherein said means for for securing said layers to a slanted surface comprises:

at least one strap secured to said layers at one end thereof, and a hook secured to said at least one strap.

8. The slip resistant mat as claimed in claim 1, wherein said means for for securing said layers to a slanted surface comprises:

a pair of straps secured to said layers at one end thereof, and a hook secured to each of said straps.

9. The slip resistant mat as claimed in claim 7, wherein said hook is coated with a resilient material.

10. The slip resistant mat as claimed in claim 8, wherein said hooks are coated with a resilient material.

* * * * *